Inventor:
Robert A. C. Calder
John J. Kowalik
Atty.

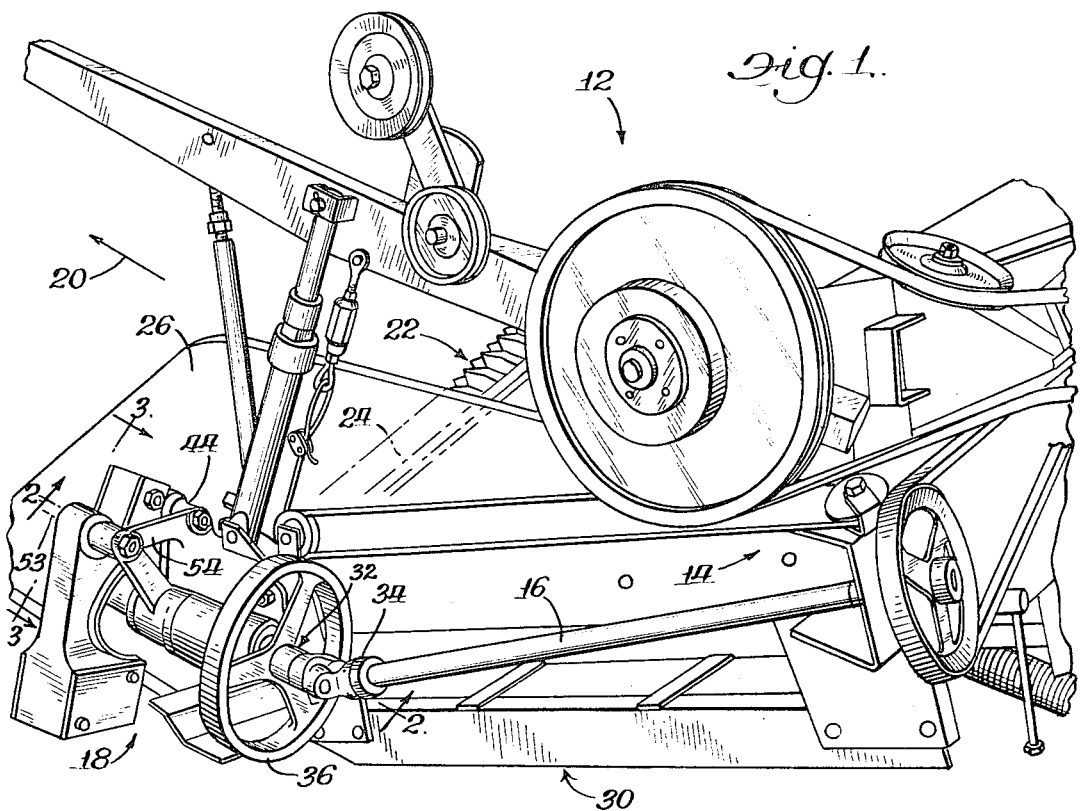

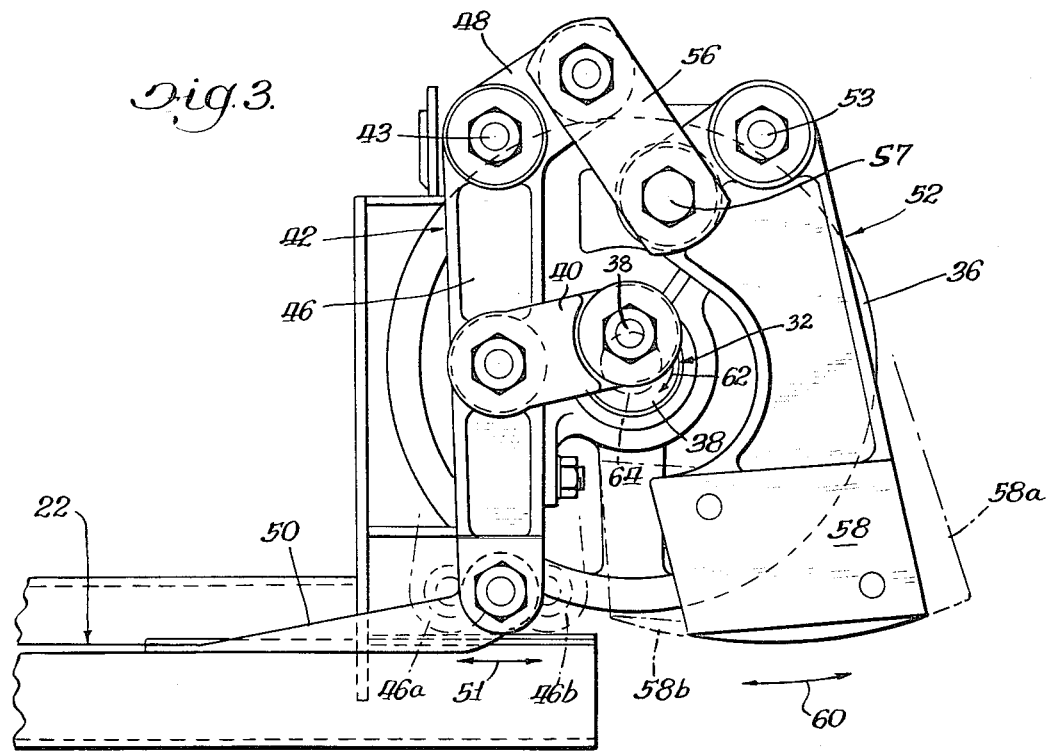
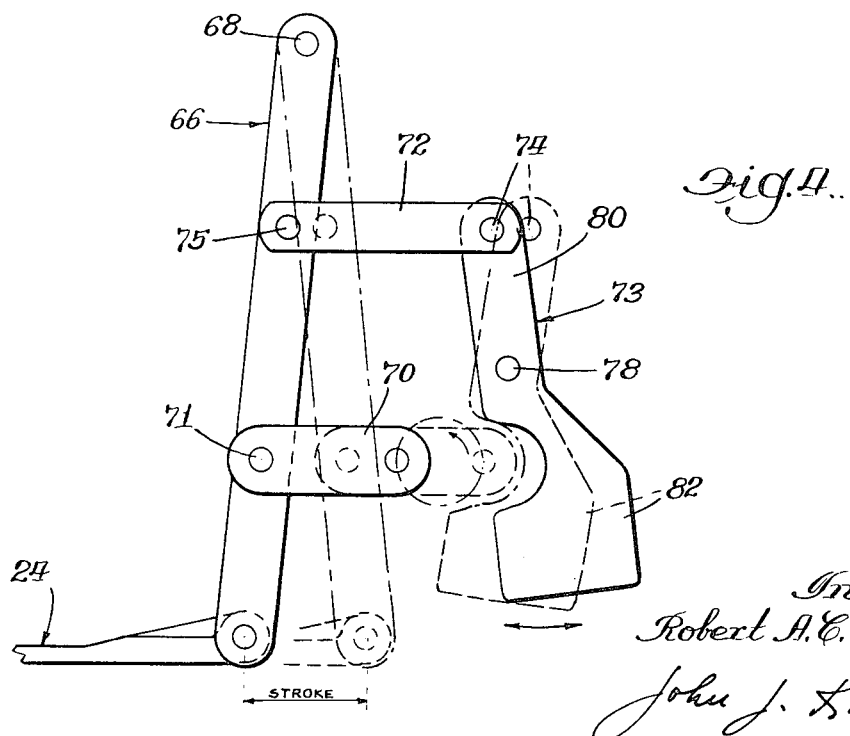

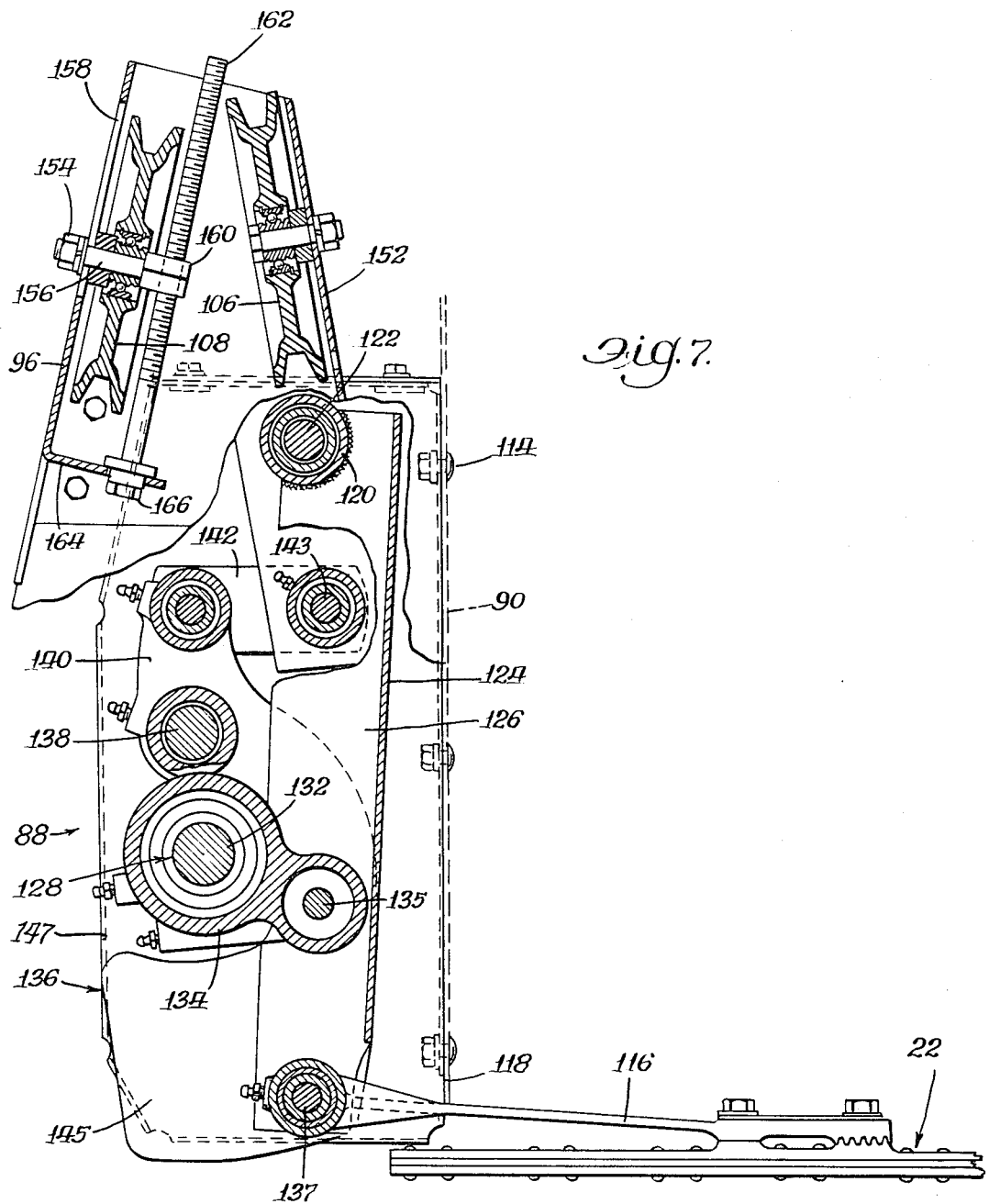

United States Patent Office 3,412,538
Patented Nov. 26, 1968

3,412,538
HARVESTER WITH COUNTERBALANCED
RECIPROCATING MEMBERS
Robert A. C. Calder, Hamilton, Ontario, Canada, assignor to International Harvester Company, Chicago, Ill., a corporation of Delaware
Filed June 21, 1966, Ser. No. 559,152
14 Claims. (Cl. 56—306)

The present invention relates to a harvester with counterbalanced reciprocating members.

The invention relates particularly to a cutter used in such a harvester of the reciprocating type, and more specifically such a cutter having a reciprocating sickle.

A broad object of the invention is to provide novel construction in a reciprocating sickle type of cutter which is effective for substantially eliminating vibration therefrom and thereby enabling much greater speeds of operation of the cutter.

A further object is to provide such a construction having a novel arrangement of counterbalanced members one of which is the sickle of the cutter, and the other of which is a member provided for counterbalancing the sickle.

A more specific object is to provide a construction of the foregoing general type particularly adapted to a relatively large cutter, such as a long sickle.

Still another object is to provide a construction of the character just referred to having a novel construction providing unusual compactness and enabling it to be placed in an out-of-the-way position.

A still further object is to provide a device of the foregoing general character having a novel unitized construction, facilitating its mounting on and demounting from an implement, as a self-contained unit.

Still another object is to provide a unit as referred to above which can be readily adapted to an existing implement, with a minimum of alteration of the implement for the purpose of applying the unit thereto.

Other objects and advantages of the invention will appear from the following detailed description taken in conjunction with the accompanying drawings in which—

FIGURE 1 is a perspective view of the major portion of a harvester embodying the features of the present invention and specifically showing the counterbalance construction of the invention;

FIGURE 2 is a large scale sectional view taken at line 2—2 of FIGURE 1;

FIGURE 3 is a view taken at line 3—3 of FIGURE 1, and also oriented according to line 3—3 of FIGURE 2, showing the counterbalance unit from the front;

FIGURE 4 is a view oriented according to FIGURE 3 and showing a modified form of the counterbalance unit;

Figure 5:
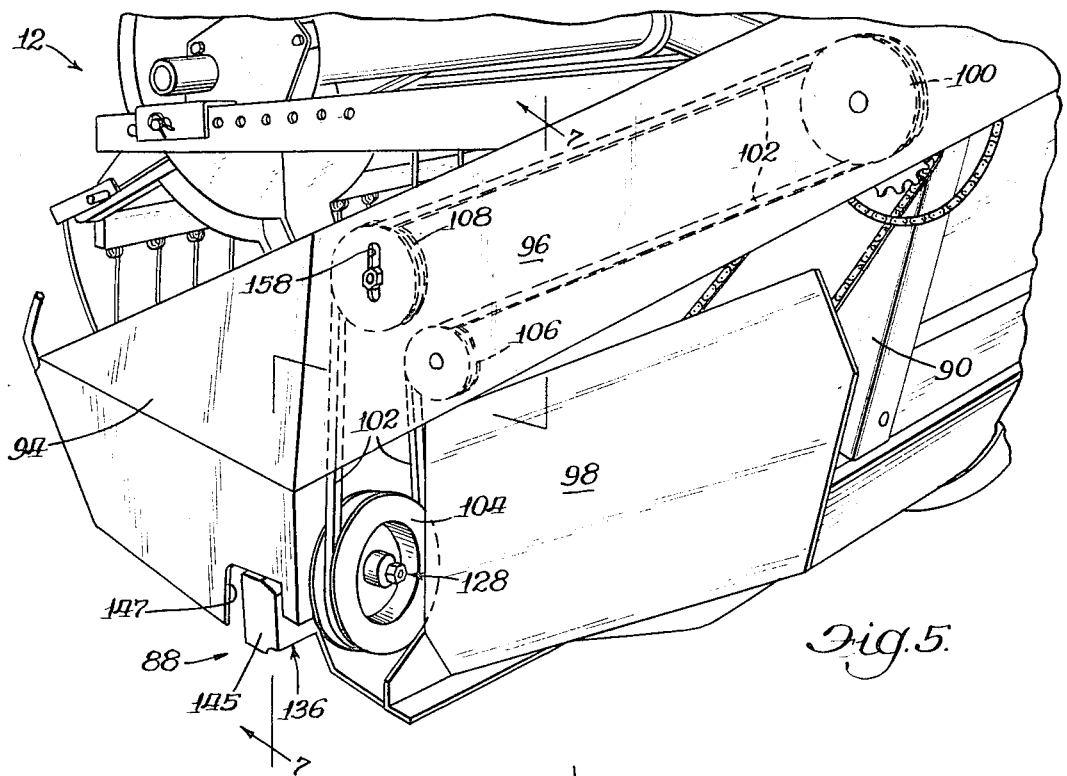
FIGURE 5 is a perspective view of an implement in which the device, in a modified form, is incorporated, showing certain other elements of the implement.
Figure 6:
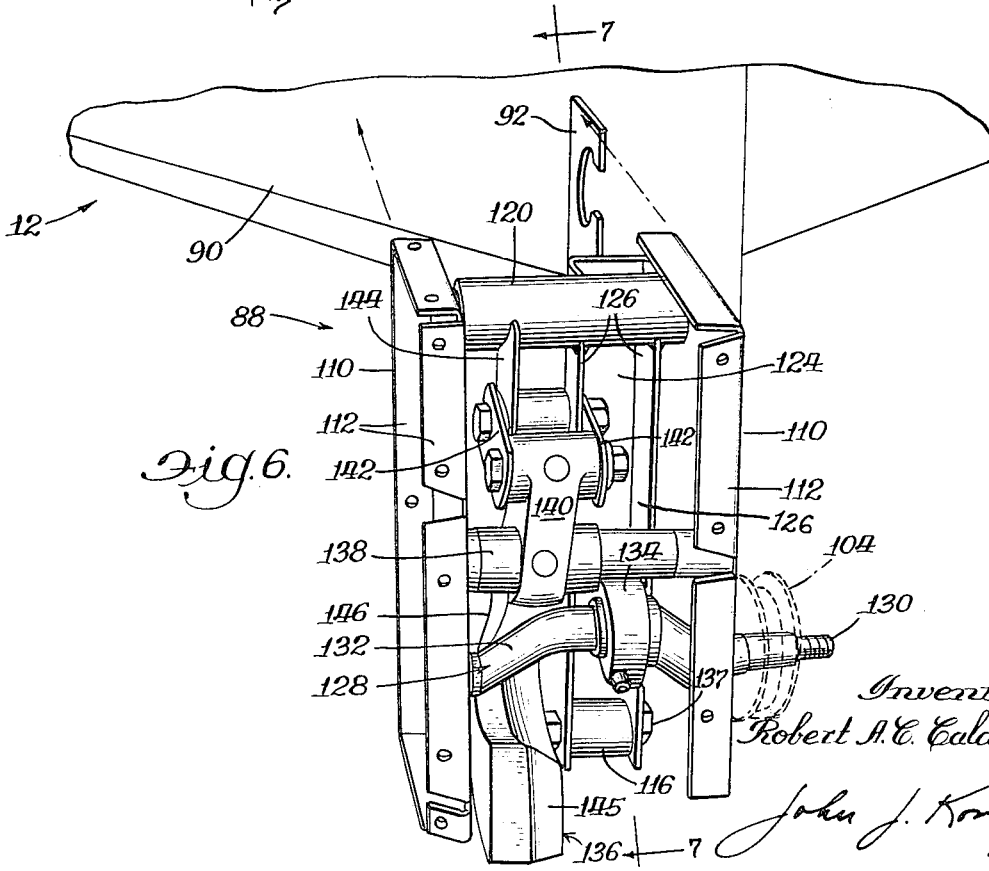

FIGURE 6 is a perspective view oriented according to the arrow 6 of FIGURE 5, showing the unit detached and removed from the implement, and showing other elements of the implement; and FIGURE 7 is a sectional view of the unit of FIGURES 5 and 6, taken at line 7—7 in each of those figures.

Referring now in detail to the accompanying drawings attention is directed first to FIGURE 1 showing a harvester 12 of a kind to which the invention is particularly adapted. The harvester shown is a windrower but the invention is adapted to such other implements as a mower or other implement having a reciprocating cutter member such as a sickle. The windrower 12 is constructed and mounted for propulsion by a tractor (not shown) and includes drive transmitting means indicated in its entirety at 14 adapted for operative connection with the power take-off means of the tractor in the usual way. The drive transmitting means includes a drive shaft 16 leading to the balance drive unit 18 which includes the principal components of the construction of the present invention.

The windrower 12 is arranged for moving forwardly in the direction of the arrow 20 and includes a cutter 22 at a leading edge of the implement and extending thereacross. The cutter, partially illustrated and partially represented diagrammatically by dot-dash line 24, includes a sickle of suitable kind which for the most part is hidden (FIGURE 1) behind a side guide or shield 26.

The balance drive unit 18 is shown in its entirety in FIGURE 2 and includes a frame or body 28 which may for example be a casting and is mounted on the frame 30 of the windrower. The balance drive unit 18 includes a main shaft 32 journalled in a bearing housing 34 included in the frame 28. The shaft 32 is connected with the drive shaft 16 through a suitable connection such as a universal coupling 35, a flywheel 36 being mounted on the shaft 32.

The main shaft 32 at its forward end is provided with a crank 38. A link 40 is pivoted at one end to the crank and at its other end to a drive arm 42 which in the present instance is in the form of a bell crank. The drive arm 42 is rockably mounted on an axis 43 adjacent its upper end on a boss 44 forming a part of the frame 28 and has a relatively long depending arm 46 arranged as a pendulum and a relatively short arm 48 at an angle to the first arm. The link 40 is connected to the arm 46 preferably adjacent the mid point of the latter (see FIGURE 3) and the latter is pivotally connected at its lower end to a fitting 50 forming part of the sickle 22. The sickle is reciprocable in the usual way and, as viewed in FIGURE 3, in directions transverse to the line of sight, as indicated by the double headed arrow 51. The full line representation of the arm 46 in FIGURE 3 indicates a middle position while the dot-dash line representations indicate the opposite limits of reciprocation.

A counterbalance weight member 52 is provided, and pivoted on an axis 53 at its upper end on a boss 54 forming part of the casting 28. A link 56 (FIGURE 3) is pivotally connected at one end to the swinging end of the arm 48 of the drive arm and at its other end to the counterbalance weight member on an axis 57 at a position eccentric to, but adjacent to, the axis 53. The counterbalance weight member 52 thus depends downwardly and functions as a pendulum. The member 52 includes a relatively large weight element 58 which is preferably quite massive and while the member is mounted for oscillating movement, the weight element 58 moves in a direction closely approximating a reciprocating movement, as indicated by the double headed arrow 60.

The full line representation of the member 52 indicates its approximate middle position while the dot-dash line representations indicate its opposite extreme positions.

Upon rotation of the main shaft 32, in whichever direction is selected, such as indicated by the arrow 62 in FIGURE 3, the crank 38, acting through the link 40, swings the drive arm 42, resulting in reciprocating movement of the sickle 24. The throw of the crank 38 is indicated by the dot-dash circle 64 in FIGURE 3 and since the link 40 is connected to the arm 46 at a position adjacent its midpoint, the throw of the lower end of the arm 46 is in the neighborhood of twice the diameter of the circle 64.

The relative positions of the movable elements of the balance drive unit, and the connections therebetween, are such that the counterbalance weight member or arm 52 swings in directions opposite those of the sickle, the corresponding limit positions of these two members being indicated by the subscripts *a* and *b*.

The construction described above substantially eliminates vibration to the frame of the implement caused by the reciprocating sickle. As is known, such vibrations as heretofore experienced, are extremely objectionable resulting in damage to the implement and seriously limiting the speed of operation of the implement since the vibration and resulting forces on the implement increase with the square of the speed. The discomfort to the operator, when the operator rides directly on the implement, are also extreme, but with the present construction such vibration is greatly reduced and in fact substantially eliminated.

The lower end of the drive arm 46 is substantially in longitudinal alignment with the sickle, and although the arm follows an oscillating movement, the lower end thereof follows in nearly a reciprocating movement, due to its short stroke and its middle position being perpendicular to the line of reciprocation of the sickle. The total throw of the driving arm is preferably on the order of between 10° and 18°, while a throw of 12° has been found very satisfactory.

Another great advantage of the arrangement is that the members occupy an extremely compact space, the counterbalance weight member 52 being closely adjacent the drive arm 46, and the member 52 and the weight thereon being contained within the space that would otherwise be normally not used as, for example, as viewed in FIGURE 3 being contained mostly within the axial projection, horizontally, of the flywheel 36.

The range of reciprocation of the sickle is on the order of 3″ to 4″ which is extremely small relative to the length of the sickle. The throw of the lower end of the drive arm 46 and of the lower end of the weight member 52 are of course of this same small magnitude and as a result, the arms 42 and 52 can be located so close together that in the extreme positions of the arms in the retracted position of the sickle, the lower ends of the arms can be, and in the present instance are, substantially adjacent each other, which enables unusual compactness of the device.

The construction of the present invention is particularly effective in relatively large implements such as windrowers, etc., having a cutter or sickle of unusual length such as in the neighborhood of 8 feet, 10 feet, 12 feet, etc. The resistance and reaction of such a sickle is immense, and the driving force required is correspondingly great; as a result, in rapid operation of such a sickle the vibrations produced are extremely great with corresponding serious damage to the implement. The invention is particularly effective for overcoming and eliminating such serious vibrations. Since the construction can be placed in a compact space, a counterbalance weight member of great mass can be provided to counterbalance the effects of the large sickle. Because of the magnitude of the forces involved, particularly in a large implement as mentioned, the positioning of the drive arm 42 and the counterbalance weight member 52 as referred to above, is particularly important, i.e., the swinging ends of those arms are substantially and effectively in the line of reciprocation of the sickle, resulting in a natural balancing position.

The counter balance weight member 52 is of a length closely approximating that of the drive arm 46 and the weight element 58 is substantially complementary to the forces involved in movement of the sickle so as to produce a highly balanced arrangement of members. It will be noted that the axes of connection between the link 56 and the drive arm 42 and the counterbalance arm 52, are spaced from the rocking axes 43 and 53 only short distances which constitute another feature of the compactness of the arrangement, there being substantially greater throw at the lower ends of those members than at their upper ends.

Both the drive arm 42 and the counterbalance arm 52 being of pendulum form provide an added advantage in the initiation of movement of the various members after coming to a stop, that is, at the end of a reciprocation when the various members are stationary, the counterbalance weight 58 is at an elevated position and gravity operates to initiate movement thereof, and thereby of the sickle, at the beginning of each next reciprocation.

A slightly modified form of the arrangement is shown in FIGURE 4. Instead of the drive arm 42 a drive arm 66 is utilized, pivoted at 68 at its upper end. A link 70, corresponding to the link 40 of FIGURE 3 is interconnected between the crank 38 and the drive arm 66 at an axis 71 on the latter, and a link 72 corresponding to the link 56 of FIGURE 3 is interconnected between the drive arm and the counterbalance weight member 73 at an axis 74 on the latter. However in the present instance the link 72 is pivoted at 75 on the arm 66, at a point substantially below the rocking axis 68 of the latter, the drive arm being of corresponding length and pivoted at a higher point in the construction of the machine. The counterbalance weight member 73, pivoted at 78, has an upwardly extending arm 80 to which the link 72 is pivotally connected, and a counterbalance weight element 82 depending downwardly. Upon rocking of the drive arm 66 between its full and dot-dash line positions, corresponding movements are imparted to the counterbalance weight member 73. Similar results are attained in the case of the present construction in which both the drive arm and the counterbalance weight member are longer, and the drive arm 66 is in the form of a second class lever as contrasted with the first class lever arrangement of the drive arm 42.

Attention is now directed to FIGURES 5, 6, and 7 showing a balance drive unit 88 completely unitized and mountable on and demountable from the implement as a self-contained unit. The present unit is adapted for incorporation in an existing implement with a minimum of alteration of the implement for that purpose, and also adapted to substantial enclosure in the implement by means of outer shielding members. In this case, the frame and housing of the windrower 12 has an end panel 90 corresponding to the side guide or shield 26 referred to above. This end panel is utilized for mounting the unit 88 directly thereon and for this purpose includes a plate 92 extending outwardly from the end panel. The unit when mounted in place may be generally enclosed by outer panels or plates 94, 96, and 98 secured to suitable elements of the frame. The drive transmitting means 14, identified above, in this case includes a driving pulley 100 over which is trained a belt 102 having driving connection with a driven pulley 104 incorporated in the unit 88 and referred to again hereinbelow. The pulley 104 as seen in FIGURE 5 is disposed outwardly, or rearwardly, from the plate 92 relative to the remainder of the unit. The belt 102 is trained over idler pulleys 106 and 108, the latter of which is a tightener pulley as will be referred to hereinbelow. The pulleys 100, 106 and 108 are concealed by the panel 96 as is the major portion of the belt 102.

The unit 88 is shown best in its entirety in FIGURE 6 where it is shown demounted from and separated from the implement. In this view also, the outer panels 94, 96 and 98 are removed. The unit includes a pair of side plates 110 which may be of sheet metal and provided with flanges 112 for mounting the unit on the implement. This mounting is arranged by butting one of the side plates 110 (at the right, FIGURE 6) to the plate 92 and securing it thereto as by bolting. The flanges on the two side plates are also butted against the end panel 90 and secured to that element also as by bolts, as shown at 114 in FIGURE 7. When the unit is thus mounted in position, the outer plates 94, 96 and 98 are put in place, covering most of the unit.

The sickle 22 identified above is also shown in FIGURE 7, its proximate end extending through an opening 118 where, through an operating member 116, it is connected with the unit 88 at the bottom thereof.

The main operating components of the unit 88 of FIGURES 5 to 7 are equivalent in a general way with those of the embodiment of FIGURE 4. These components unless otherwise indicated are mounted in the side plates 110, either directly or indirectly. The operating components include a sleeve 120 adjacent the upper end of the unit and rockably mounted in a suitable manner such as on a shaft 122. Secured to the sleeve is a pendulum lever, or driving lever, 124 preferably in the form of a channel having flanges 126, and mounted as by welding the flanges directly to the sleeve. The operating member 116 is pivotally connected with the lower end of the lever 124 and upon swinging movement of the lever the sickle 22 is reciprocated in a known manner. The direction of reciprocation of the sickle is toward and from the observer with relation to FIGURE 6.

The driving means for the lever 124 includes a crank shaft 128 having an extension 130 beyond one of the side plates on which the driven pulley 104 is mounted. The crankshaft includes a crank 132 on which one end of a pitman 134 is mounted, the other end of the pitman being connected with the lever 124 by shaft 135. The connection with the lever is through the flanges 126, whereby to minimize the effective distance between the lever and the axis of the crank shaft, providing additional compactness in the arrangement.

A pendulum counterbalance weight member 136 is pivotally mounted on a shaft 138 above the crankshaft and has an upwardly extending relatively short arm 140. Link means 142 pivotally interconnects the upper end of the arm 140 and the lever 124 at a point on the lever adjacent the upper end thereof.

The link means 142 includes two links, both connected with the upper end of the weight member 136 and to a shaft 143 mounted in one of the flanges 126 on the lever and an arm 144 secured to the sleeve 120 as by welding, and spaced from the lever 124 axially along the sleeve. This arrangement provides for positioning the weight member 136 in axially offset relation to the lever 124. When the lever is swung or oscillated, it of course rocks the sleeve 120 and thereby swings the arm 144, the lever and arm, acting through the links 142, producing the swinging or oscillation of the weight member. The weight member 136 has a weight element 145 at its lower end above which is a bowed portion 146 partially surrounding the crankshaft, and at times the crank thereof. This weight element is of great mass whereby to provide great counterbalance effect for a relatively short length thereof. The outer panel 94 may have an opening 147 through which the weight element 145 can project in outward swinging movement. The arrangement enables a very small dimension of unit in the direction of reciprocation and oscillation of the various members, i.e., transversely as viewed in FIGURE 7, resulting in an extremely compact arrangement that can be added to an implement such as a mower or windrower with minimum increase in the transverse dimension of the implement. The means for mounting the unit on the implement is extremely simple, including only the plate 92 together with the means for securement of the unit thereto and to the end panel 90.

FIGURE 7 shows the mounting arrangement of the idler pulleys 106 and 108 which may be conveniently positioned above the unit. For example the pulley 106 can be mounted in an element 152 which may be part of or added to the end panel 90. The pulley 108 may be mounted in the outer shield or plate member 96 (see also FIGURE 5). One of the pulleys is preferably adjustable, such as the pulley 108 which is on the advance run of the belt. The adjustability is provided by an arrangement including a nut 154 reacting against the plate 96 and threaded on a bolt 156 which constitutes the shaft of the pulley, the shaft being slidable in a slot 158 in the plate 96. At the other end of the shaft is a head member 160 having a tapped transverse aperture threadably receiving a rod 162 which extends parallel with the slot 158 and mounted in a suitable manner such as on a flange or foot 164 struck in from the plate 96. Adjustment of the pulley is provided by turning the rod by gripping the head 166 thereof, the nut 154 being utilized for securing the pulley in position after being adjusted.

While I have disclosed herein certain preferred embodiments of the invention it will be understood that changes may be made therein within the spirit and scope of the appended claims.

I claim:

1. A harvester of the character disclosed adapted for travel in a forward direction, comprising a frame, a cutter at a leading edge of the frame and extending substantially thereacross transverse to the direction of travel of the harvester, the cutter including a reciprocating member, means for driving the reciprocating member, and counterbalancing means connected with the driving means and having at least an element mounted for pendulous reciprocating movement in opposition to the reciprocation of the cutter member and in alignment with said cutter and said drive means.

2. The invention set out in claim 1 wherein the driving means includes a first lever connected to the reciprocating member, and the counterbalancing means includes a second lever, said levers being pivoted on axes extending generally in the direction of travel of the harvester.

3. The invention set out in claim 2 wherein the reciprocating member is a sickle, and the first lever is pivotally supported at its upper end and has its lower end connected with the sickle, said levers are incorporated in an assembly positioned at one end of the frame.

4. The invention set out in claim 3 wherein the point of connection between the first lever and the sickle is substantially in the line of reciprocation of the sickle and the second lever also is pivoted adjacent its upper end, and has a weight element effectively in said line of reciprocation.

5. The invention set out in claim 4 wherein both said levers are so mounted that when in their positions midway between their limits of swinging movement they are substantially perpendicular to said line of reciprocation.

6. The invention set out in claim 1 wherein the cutter includes a reciprocating sickle extending substantially the width of the harvester and its range of reciprocation is extremely small relative to its length, the great length of the sickle requiring extreme forces for its operation, and wherein the driving and counterbalancing means include a pair of pendulum type levers depending from their pivot axes and having their lower ends substantially in the line of reciprocation of the sickle, and the relative positioning of the levers and their dimensions are such that when in one extreme position of the sickle the lower ends of the levers are substantially adjacent each other.

7. The invention set out in claim 6 wherein the range of reciprocation of the sickle is in the neighborhood of 3 inches to 3½ inches and levers are of such length that their angular movement is in the neighborhood of 10° to 18°.

8. The invention set out in claim 1 wherein the driving means and counterbalancing means include a pair of levers, both of which are effectively first class levers, and a link interconnects the levers at axes closely adjacent the mounting axes of the levers.

9. The invention set out in claim 1 wherein the driving means and counerbalancing means include a pair of levers, a first of the levers constituting a driving lever and being pivoted at its upper end and having its lower end connected with the reciprocating member of the cutter, and a second of the levers including said counterbalancing means and pivoted on an axis intermediate its ends and having an upwardly extending arm, a link interconnects the levers at a point on the first lever below the mounting axis thereof, and at the upper end of the extended arm on the second lever.

10. The invention set out in claim 1 wherein a self-contained unit is provided and mountable on and demountable from the frame as such unit, said unit including said counterbalance member, means for connection with the reciprocating member, and means for transmitting drive from the driving means to the reciprocating member.

11. The invention set out in claim 10 wherein said drive transmitting means includes a swingable lever and a crankshaft, and the unit includes a pair of side plates spaced along the axes of the movable elements referred to, and the unit is mountable on the implement by securing the side plates to the frame of the implement, the mounting means also including a plate extending transverse to said axes and butted flat to one of said spaced side plates and secured thereto.

12. The invention set out in claim 1 wherein a self-contained unit is provided and mountable on and demountable from the frame as such unit, said unit including said counterbalance member, means for connection with the reciprocating member, and means for transmitting drive from the driving means to the reciprocating member, said counterbalance member including a pendulum lever, said drive transmitting means including a pendulum driving lever of channel shape in cross section, a crankshaft and a connecting rod connected between the crankshaft and driving lever and having its connection with the driving lever between the flanges of the latter, said counterbalance member being offset axially from said driving lever and connecting rod and having a bowed portion in register with said crankshaft and a counterbalance element extending a substantial distance beyond said crankshaft whereby to enable an extremely compact arrangement between the various parts in the direction of oscillation of said counterbalance element, and link means connecting said counterbalance member and driving lever for mutually opposite oscillating movement.

13. The invention set out in claim 1 wherein the implement includes an end panel adjacent one end of the reciprocating member, a self-contained unit is provided and includes a driving lever connected at its swinging end to said reciprocating member, said unit including said counterbalancing means which is in the form of a lever, means is provided for interconnecting the levers for mutually opposite oscillatory movement, said unit also including a crankshaft operatively connected with the driving lever, a driven pulley is mounted on said crankshaft, said unit is mounted on said end panel and the implement includes shielding members secured to the frame and disposed generally over a substantial portion of said unit, in direction outwardly from said end panel, the driving means of the implement includes a drive pulley, and a drive belt is operatively connected between said drive pulley and driven pulley, and the belt is concealed in great part between said end panel and shielding members.

14. The balance drive unit adapted for mounting on and demounting from an implement as a self-contained unit, comprising a pair of side plates spaced apart in the direction of the axes of the movable members recited hereinbelow, a sleeve rockably mounted adjacent the upper end of the unit, a pendulum driving lever secured to the sleeve and extending downwardly, a counterbalance member in the form of a pendulum lever pivoted on an axis below its upper end, means operatively interconnecting the upper end of the counterbalance member and said driving member at a position adjacent the axis of the driving lever, said driving lever and counterbalance member thus oscillating in mutually opposite directions, means for driving said driving lever including a crankshaft, said counterbalance member being off-set axially from said driving lever, and said counterbalance member having a bowed portion between its axis of oscillation and its lower swinging end partially surrounding the axis of the crankshaft and at times partially surrounding the crank of the crankshaft.

References Cited

UNITED STATES PATENTS

| 2,428,924 | 10/1947 | Albertson | 74—604 |
| 2,895,282 | 7/1959 | Myers | 56—306 |
| 2,922,268 | 1/1960 | Prichard | 56—306 |
| 3,000,226 | 9/1961 | Muehlhausen | 74—40 |
| 3,092,947 | 6/1963 | Scarnato et al. | 56—25 |
| 3,108,421 | 10/1963 | Leverenz | 56—297 |

RUSSELL R. KINSEY, *Primary Examiner.*